United States Patent
Borate et al.

(10) Patent No.: US 11,003,623 B2
(45) Date of Patent: May 11, 2021

(54) SNAPSHOT USAGE TRACKING SYSTEM AND METHOD

(71) Applicant: DRUVA INC., Sunnyvale, CA (US)

(72) Inventors: Milind Vithal Borate, Pune (IN); Somesh Jain, Pune (IN)

(73) Assignee: DRUVA INC., Sunnyvale, CA (US)

(*) Notice: Subject to any disclaimer, the term of this patent is extended or adjusted under 35 U.S.C. 154(b) by 72 days.

(21) Appl. No.: 16/361,847

(22) Filed: Mar. 22, 2019

(65) Prior Publication Data
US 2020/0226029 A1 Jul. 16, 2020

(30) Foreign Application Priority Data

Jan. 10, 2019 (IN) .............................. 201941001215

(51) Int. Cl.
*G06F 16/11* (2019.01)
*G06F 16/16* (2019.01)
*G06F 16/18* (2019.01)

(52) U.S. Cl.
CPC .......... *G06F 16/128* (2019.01); *G06F 16/162* (2019.01); *G06F 16/1873* (2019.01); *G06F 2201/84* (2013.01)

(58) Field of Classification Search
CPC .... G06F 16/11; G06F 16/128; G06F 16/1873; G06F 16/219; G06F 2201/84
See application file for complete search history.

(56) References Cited

U.S. PATENT DOCUMENTS

| | | | |
|---|---|---|---|
| 7,100,089 B1* | 8/2006 | Phelps | G06F 3/0607 711/162 |
| 7,379,954 B2* | 5/2008 | Shoens | G06F 16/128 |
| 9,753,932 B1* | 9/2017 | Brow | G06F 11/1469 |
| 2014/0181441 A1* | 6/2014 | Kottomtharayil | G06F 3/0613 711/162 |
| 2019/0294687 A1* | 9/2019 | Rice | G06F 16/13 |

* cited by examiner

*Primary Examiner* — Tamara T Kyle
*Assistant Examiner* — Lana Alagic
(74) *Attorney, Agent, or Firm* — BakerHostetler

(57) ABSTRACT

A snapshot usage tracking system and method for a versioned storage is provided. The system includes a memory having computer-readable instructions stored therein and a snapshot repository configured to store a plurality of snapshots of a versioned storage. Each of the plurality of snapshots includes one or more data blocks. The system further includes a processor communicatively coupled to the snapshot repository and configured to maintain a set of snapshot counters corresponding to each of previous snapshots created on or before a current snapshot based upon a size of the data blocks that are modified or deleted in the current snapshot.

15 Claims, 6 Drawing Sheets

SNAPSHOT USAGE TRACKING SYSTEM AND METHOD

PRIORITY STATEMENT

The present application claims priority under 35 U.S.C. § 119 to Indian patent application number 201941001215 filed 10 Jan. 2019, the entire contents of which are hereby incorporated herein by reference.

FIELD

At least one example embodiment relates generally to versioned storage systems, and more particularly to systems and methods for tracking snapshot usage in versioned storage systems.

BACKGROUND

Amount of data stored on digital computing systems has substantially increased over the recent years. Certain storage systems implement storage of snapshots to facilitate advanced data protection thereby reducing data recovery time. Such storage systems employ backup of large volumes of data in an efficient way facilitating instant recovery from the stored snapshots. From time-to-time, snapshots of data blocks can be obtained and stored. A storage snapshot is a back-up copy of one or more data blocks that is created at a particular point-in-time.

Further, such storage systems also allow deletion of snapshots when no longer used/required. This in turn reduces the storage costs as space freed up owing to deletion of snapshots could be reused. However, in such storage systems information related to the deleted snapshot is also deleted and the freed-up space is recalculated and reclaimed. Reclaiming storage space can be a time-consuming process and might take long when many snapshots are deleted on a system. Moreover, the size of the storage which is freed up at the time of snapshot deletion may not be readily available for use.

Existing storage systems do not allow for estimation of size of freed up storage without going through space reclaiming process. Presently, estimation of the freed-up storage is performed by scanning the blocks present in the storage system and identifying blocks that are not referenced by live snapshots. However, such estimation is complex and may be time consuming resulting in a slow space reclaiming process.

SUMMARY

The following summary is illustrative only and is not intended to be in any way limiting. In addition to the illustrative aspects, example embodiments, and features described, further aspects, example embodiments, and features will become apparent by reference to the drawings and the following detailed description. Example embodiments provide a snapshot usage tracking system.

Briefly, according to an example embodiment, a snapshot usage tracking system for a versioned storage is provided. The system includes a memory having computer-readable instructions stored therein and a snapshot repository configured to store a plurality of snapshots of a versioned storage. Each of the plurality of snapshots includes one or more data blocks. The system further includes a processor communicatively coupled to the snapshot repository and configured to maintain a set of snapshot counters corresponding to each of previous snapshots created on or before a current snapshot based upon size of the data blocks that are modified or deleted in the current snapshot.

According to another example embodiment, a snapshot usage tracking system for a versioned storage is provided. The system includes a memory having computer-readable instructions stored therein and a snapshot repository configured to store a plurality of snapshots of a versioned storage. Each of the plurality of snapshots includes a plurality of files and each of the plurality of files includes one or more data blocks. Further the system includes a processor communicatively coupled to the snapshot repository. The processor is further configured to maintain a set of file counters for each file based on a size of added or modified data blocks of the respective file. The processor is also configured to maintain a set of snapshot counters corresponding to each of the previous snapshots created on or before a current snapshot based upon the size of data blocks modified or deleted in the current snapshot.

According to yet another embodiment, a method for tracking snapshot usage for a versioned storage is provided. The method includes accessing contents of a plurality of snapshots. Each of the plurality of snapshots includes one or more data blocks. The method further includes comparing each current snapshot with previous snapshots to identify one or more modified data blocks in the current snapshot. Further, the method includes maintaining a set of snapshot counters for each of the previous snapshots created on or before the current snapshot based upon the one or more modified data blocks.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
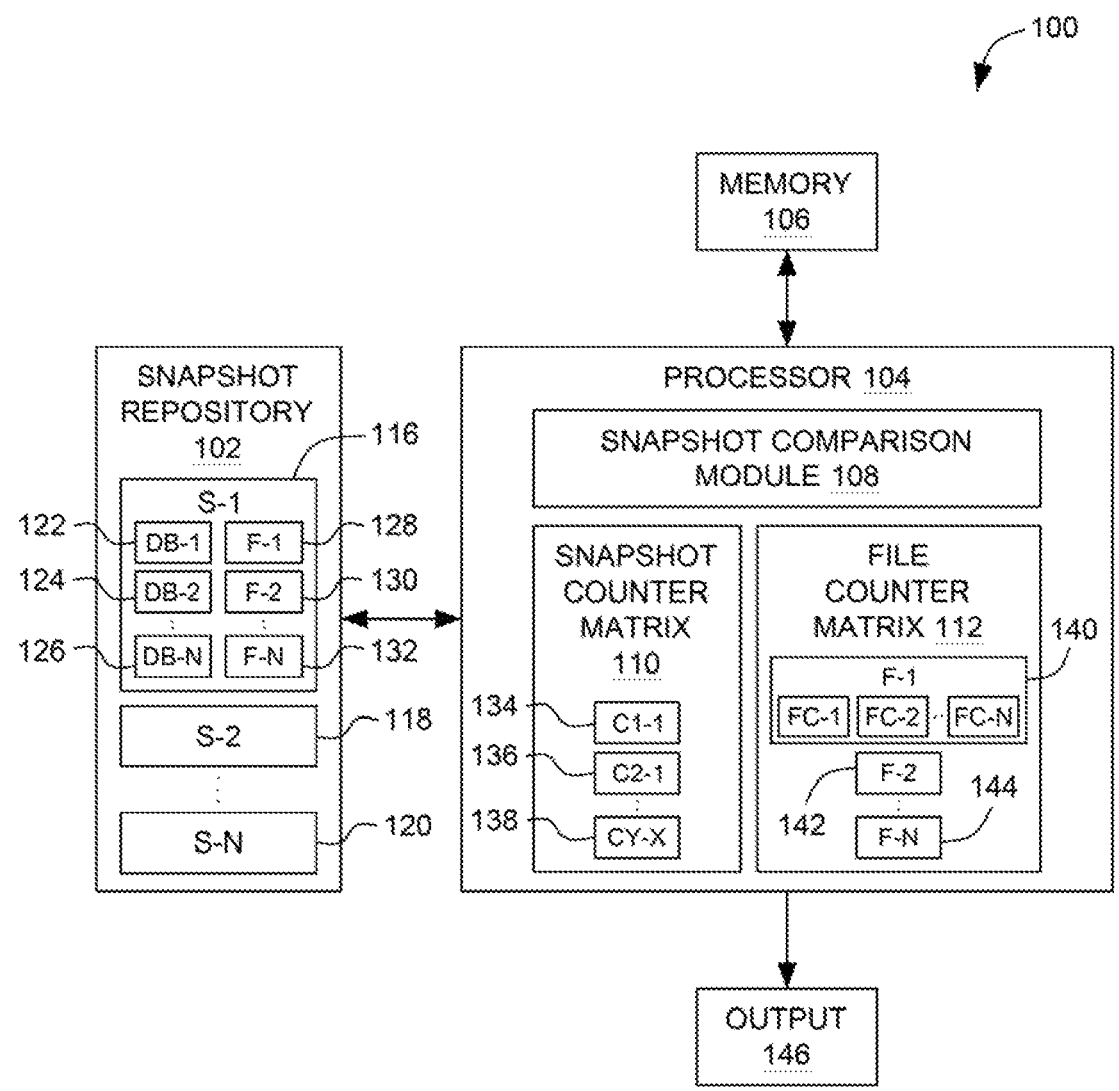
FIG. 1 is an example illustration of a snapshot usage tracking system, implemented according to aspects of present technique.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The device(s)/apparatus(es), described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described example embodiments of the inventive concept may be implemented with program instructions which may be executed by computer or processor and may be recorded in computer-readable media. The media may also include, alone or in combination with the program instructions, data files, data structures, and the like. The program instructions recorded in the media may be designed and configured especially for the example embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to execute one or more software modules to perform the operations of the above-described example embodiments of the inventive concept, or vice versa.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments are directed to systems and methods for tracking usage of snapshots in versioned storage systems and in particular techniques for estimating size of storage freed up by deletion of snapshots in such storage systems.

FIG. 1 is an example illustration of a snapshot usage tracking system 100, implemented according to aspects of present technique. The snapshot usage tracking system 100 includes a snapshot repository 102, a processor 104 and a memory 106. The processor 104 further includes a snapshot comparison module 108, a snapshot counter matrix 110 and file counter matrix 112. Each of these components will be described in a greater detail below.

In this example, the snapshot repository 102 may be a versioned storage configured to store a plurality of snapshots such as S-1 through S-N generally represented here by reference numerals 116, 118 and 120. In an embodiment, each of the plurality of snapshots includes one or more data blocks such as represented by reference numerals 122, 124 and 126.

In another embodiment, the snapshot repository 102 includes the plurality of snapshots having a plurality of files generally represented here by reference numerals 128, 130 and 132. In this embodiment, each of the plurality of files (e.g., 128, 130 and 132) includes one or more data blocks.

The processor 104 is communicatively coupled to the snapshot repository 102 and is configured to access contents of each of the plurality of snapshots S-1 through S-N (e.g., 116, 118 and 120) stored in the snapshot repository 102. As used herein, the term "snapshot" refers to a point-in-time capture of the versioned storage.

The snapshot comparison module 108 is configured to compare a current snapshot selected from the plurality of snapshots (e.g., 116, 118 and 120) with previous snapshots to identify one or more modified data blocks (e.g., 122, 124 and 126) in the current snapshot. In this embodiment, the one or more modified data blocks (e.g., 122, 124 and 126) may include one or more of new, deleted or overwritten data blocks.

Moreover, the snapshot counter matrix 110 is configured to maintain a set of snapshot counters (such as 134, 136 and 138) corresponding to each of the previous snapshots created on or before the current snapshot based upon the one or more modified blocks (e.g., 122, 124, 126). Such snapshot counters C1-1 through CY-X (134, 136 and 138) are maintained and stored in the snapshot counter matrix 110. In this embodiment, the snapshot counter is indicative of size of data blocks that are created in the previous snapshot version (X) and valid only until the current snapshot version (Y+1). In operation, each of the snapshot counters for a version (Y) is set to a sum of the size or amount of data blocks that were deleted or overwritten in the current snapshot (Y+1) but added in each of the previous snapshot versions (e.g., X, Y, etc.).

In one embodiment, the snapshot counter matrix 110 is configured to set the snapshot counter (CY-X) for a snapshot version (Y) based on a more recent snapshot version (Y+1) with respect to a previous snapshot version (X). Here, the snapshot counter (CY-X) is indicative of a sum of the size of data blocks created in the previous snapshot version X and valid only until the more recent snapshot version (Y+1).

Figure 5:
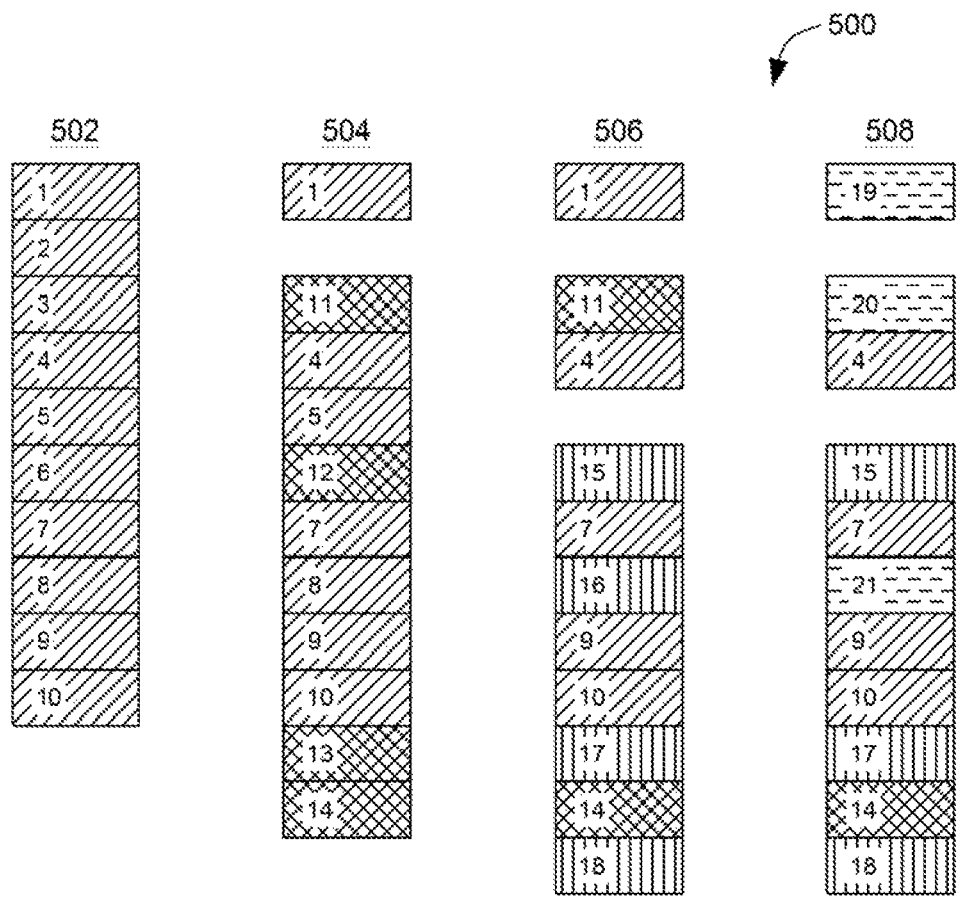
FIG. 5 illustrates example snapshots of a versioned storage having data blocks tracked using the snapshot usage tracking system of FIG. 1, implemented according to the present technique.

The processor 104 is further configured to track one or more deleted snapshots and to estimate a size of freed versioned storage based upon the set of snapshot counters (e.g., 128, 130 and 132). In particular, the processor 104 is configured to identify the one or more deleted snapshots and to verify if a creation version (i.e., snapshot version X in which one or more data blocks were added) of each snapshot counter in a set is less than or equal to a version of the immediately previous snapshot for each of the deleted snapshots. In the example of FIG. 5, if snapshot 506 is deleted, snapshot version 3 is identified and counters C3-2 and C3-1 are verified to have creation versions less than or equal to version 2. Further, the processor is configured to add the snapshot counter of each of the deleted snapshots to a corresponding entry (i.e., snapshot counter) in the previous snapshot. For example, counter C3-2 is added to counter C2-2, and counter C3-1 is added to counter C2-1, hence counters C2-2 and C2-1 are updated with the contents of counters C3-2 and C3-1, respectively.

If the creation version of the snapshot counter is greater than the version of the immediately previous snapshot for each of the deleted snapshots, the processor is configured to subtract the snapshot counter of each of the deleted snapshots from overall usage. The snapshot counter matrix 110 is configured to maintain the plurality of snapshot counters (such as 134, 136 and 138) for each of the snapshots (116, 118 and 120). The size of snapshot counters is based upon a version of the current snapshot. The entries of each of the snapshot counters may be stored by the snapshot counter matrix 110.

In another embodiment, the snapshot repository 102 includes the plurality of snapshots having files such as represented by reference numerals 128, 130 and 132. In this embodiment, each of the plurality of files (e.g., 128, 130 and 132) include one or more data blocks. Here, the contents of each of the plurality of files (e.g., 128, 130 and 132) present in the plurality of snapshots (e.g., 116, 118 and 120) are accessed by the processor 104. Further, the snapshot comparison module 108 is configured to compare each current snapshot with previous snapshots to identify one or more modified data blocks of each file (e.g., 128, 130 and 132) present in the current snapshot.

The file counter matrix 112 is configured to maintain a set of file counters FC-1 through FC-N (such as represented by reference numerals 140, 142 and 144) for each file based on the one or more added or modified data blocks of the respective file. In this embodiment, the set of file counters FC-1 through FC-N as represented by reference numerals 140, 142 and 144 are maintained and stored as metadata for each of the files (e.g., 128, 130 and 132). In operation, the processor 104 is configured to scan the plurality of snapshots 116, 118 and 120 to identify if one or more files are deleted. Further, the file counter matrix 112 is configured to update the snapshot counter for the corresponding snapshot using the current set of file counter 140, 142 and 144. Here, the file counter (F-X) represents the sum of size of data blocks of the file added or modified in version "X". The processor 104 is configured to estimate the size of freed versioned storage based upon the set of file counters and the snapshot counters. The snapshot counters, file counters and freed size data may be displayed to a user of the system 100 via an output 146.

While FIG. 1 illustrates and the following provides a detailed description of various components/modules of the system 100, example embodiments are not limited thereto. For example, the above-identified modules of the system 100 may be implemented via one or more processors (e.g., processor 104) where the one or more processor is configured to execute computer readable instructions stored on a memory (e.g., memory 106) to carry out the functionalities of each of the above-identified modules.

Figure 2:
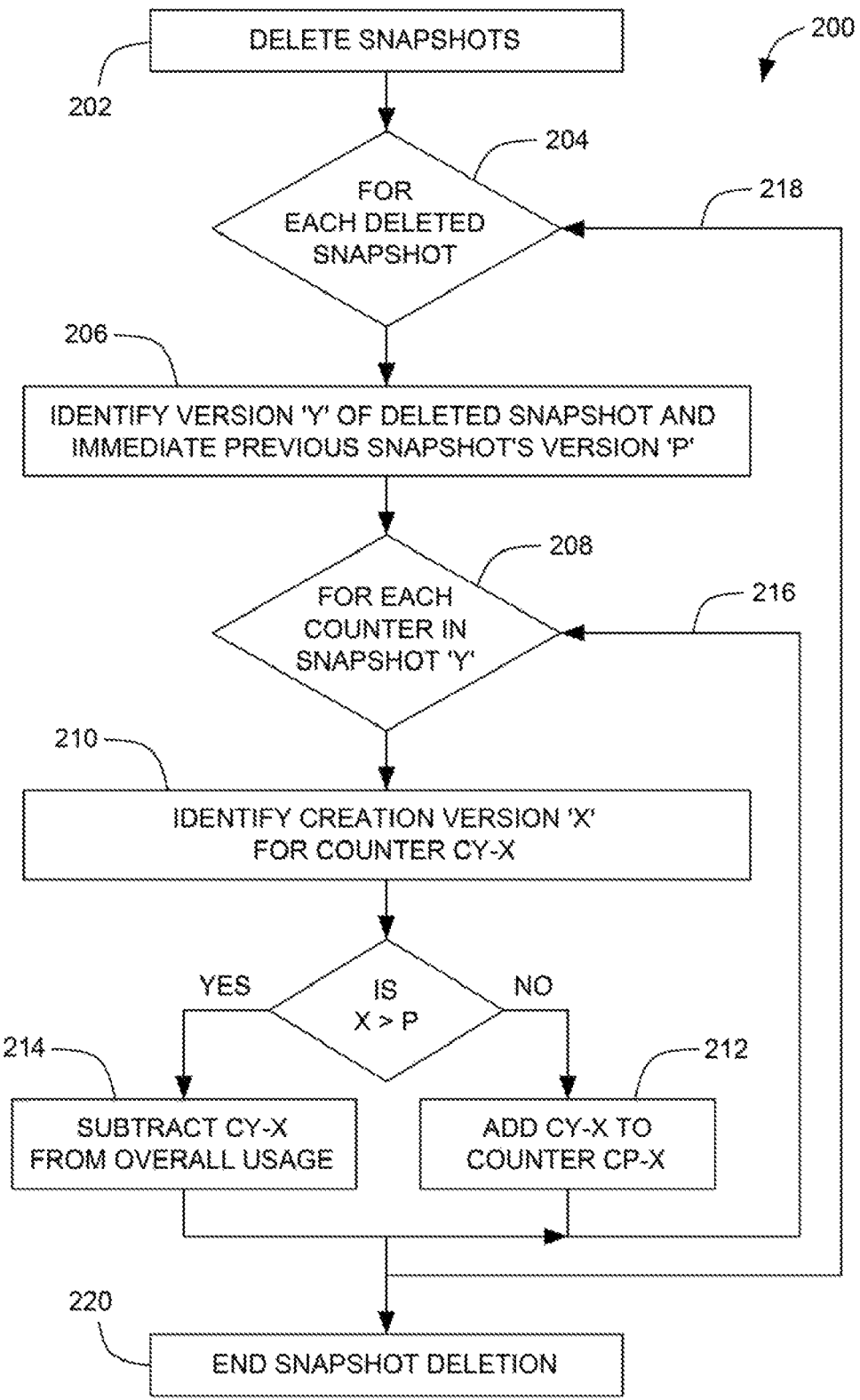
FIG. 2 is a flow chart illustrating one embodiment of a process for tracking snapshot usage for a versioned storage with snapshot deletion using the snapshot usage tracking system of FIG. 1, according to example embodiment.

FIG. 2 is a flow chart illustrating one embodiment 200 of a process for tracking snapshot usage for a versioned storage with snapshot deletion using the snapshot usage tracking system 100 of FIG. 1, according to example embodiment.

At block 202, one or more snapshots (e.g., 116, 118 and 120) are deleted from the snapshot repository 102. In an embodiment, the one or more deleted snapshots (e.g., 116, 118 and 120) are identified (at block 204).

At block 206, a version 'Y' of each of the deleted snapshots (e.g., 120) is identified. In addition, an immediate previous snapshot's version 'P' is identified.

At blocks 208 and 210, a creation version "X" is identified for each counter in snapshot 'Y'. In this embodiment, a creation version 'X' is identified for the snapshot counter CY-X. Further, the snapshot counter (CY-X) of the deleted snapshot is added to corresponding entry (CP-X) in the previous snapshot, if a creation version 'X' of the snapshot counter is lesser than or equal to the previous snapshot version 'P' (block 212). Alternatively, the snapshot counter (CY-X) of the deleted snapshot is subtracted from overall usage, if the creation version 'X' of the snapshot counter is greater than the version of the previous snapshot 'P' (block 214) before proceeding to ending of the snapshot deletion (block 216). The above steps are repeated for each snapshot counter of the deleted snapshot, as represented by reference numeral 218 before the end of snapshot deletion (220). Such snapshot counters are updated and tracked for each snapshot deletion using the snapshot counter matrix 110.

Figure 3:
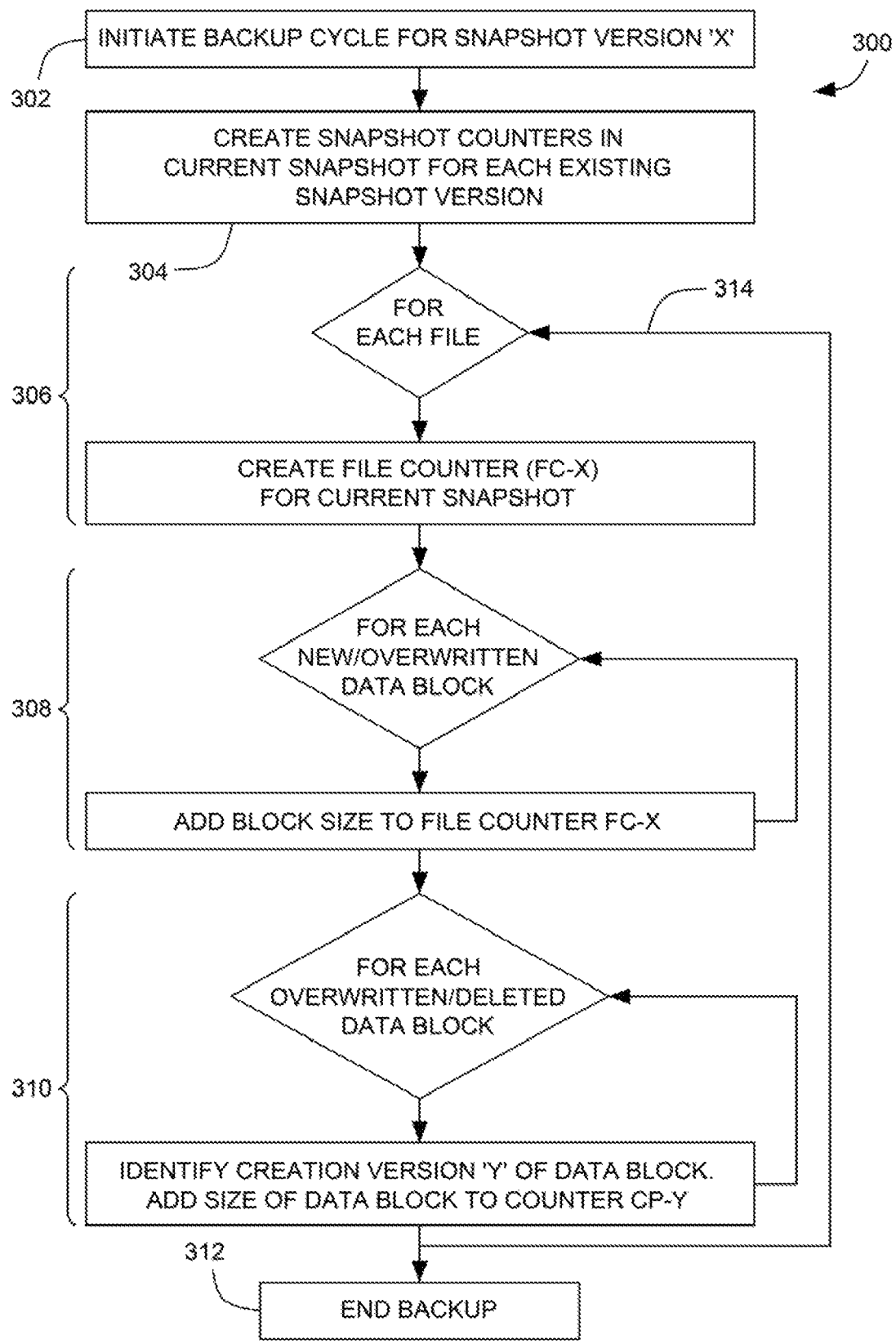
FIG. 3 is a flow chart illustrating another embodiment of a process for tracking snapshot usage for a versioned storage having modification of files using the snapshot usage tracking system of FIG. 1, according to an example embodiment.

FIG. 3 is a flow chart illustrating another embodiment 300 of a process for tracking snapshot usage for a versioned storage having modification of files using the snapshot usage tracking system 100 of FIG. 1, according to an example embodiment.

As described before, the snapshot repository 102 of FIG. 1 includes the plurality of snapshots having files such as represented by reference numerals 128, 130 and 132. Each of the plurality of files (e.g., 128, 130 and 132) include one or more data blocks. Such files 128, 130 and 132 may be modified from time-to-time and may be tracked using the snapshot usage tracking system 100 of FIG. 1.

At block 302, a backup cycle for a snapshot version 'X' is initiated. At block 304, snapshot counters such as CX-1, CX-2, . . . CX-X, are created in current snapshot for each existing snapshot version. Further, a file counter (FC-X) is created for current snapshot for each file of the current snapshot (block 306). It may be noted that each file includes one or more data blocks. In one embodiment, one or more modified data blocks of each file (e.g., 128, 130 and 132) present in the current snapshot are identified. In this embodiment, the one or more modified data blocks may include one or more of new, or overwritten data blocks.

At block 308, for each of the new and/or overwritten data blocks, a block size is added to the file counter FC-X. Moreover, a creation version 'Y' of data block is identified. Further, size of the data block is added to the snapshot counter CP-Y (block 310) before ending the backup cycle (block 312). Here "P" represents the immediate previous snapshots version. These steps may be repeated for each file as represented by reference numeral 314

Figure 4:
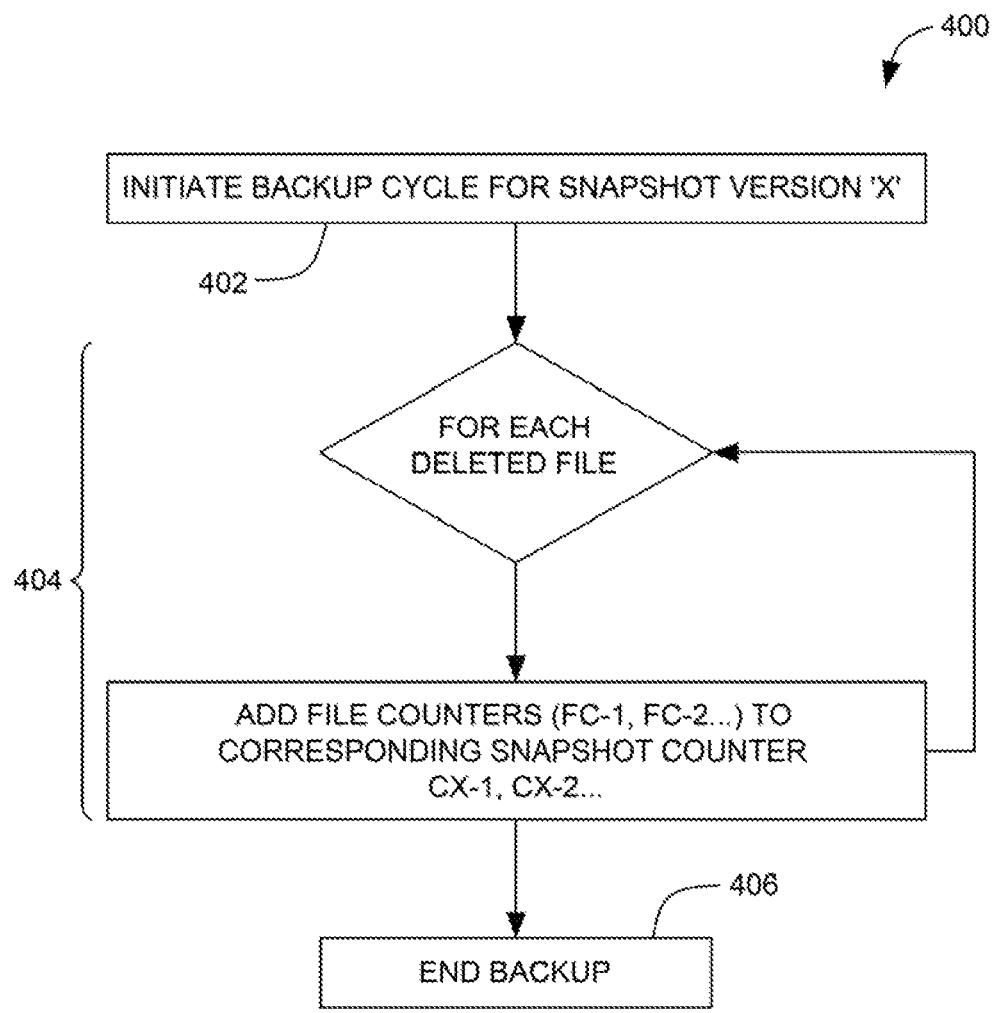
FIG. 4 is a flow chart illustrating another embodiment of a process for tracking snapshot usage for a versioned storage having file deletion using the snapshot usage tracking system of FIG. 1, according to an example embodiment.

FIG. 4 is a flow chart illustrating another embodiment 400 of a process for tracking snapshot usage for a versioned storage having file deletion using the snapshot usage tracking system 100 of FIG. 1, according to an example embodiment.

At block 402, a backup cycle for snapshot version 'X' is initiated. In this embodiment, the plurality of snapshots (e.g., 116, 118 and 120) are scanned to identify if one or more files are deleted. Further, for each deleted file, file counters (FC-1, FC-2, . . . ) are added to the corresponding snapshot counters (CX-1, CX-2, . . . ) as represented by block 404 before ending the backup cycle at block 406.

FIG. 5 illustrates example snapshots 500 of a versioned storage having data blocks tracked using the snapshot usage tracking system 100 of FIG. 1, implemented according to the present technique. In the illustrated example, a plurality of snapshots such as represented by reference numerals 502, 504, 506 and 508 are created over different points in time. As illustrated, snapshot 502 includes 10 data blocks. As can be seen, in the snapshot 504, data block 2 (present in snapshot 502) has been deleted and data block 3 and data block 6 (present in snapshot 502) are overwritten with data block 11 and data block 12 respectively. Moreover, two new data blocks 13 and 14 are added to the snapshot 504. Similarly, for snapshots 506 and 508, one or more data blocks are added, deleted, or overwritten. It may be noted that all 21 blocks are stored only once and referred to by one or more snapshots (502, 504, 506 and 508).

In the illustrated embodiment, the processor 104 of FIG. 1 is configured to compare these snapshots 502, 504, 506 and 508 to identify the modified data blocks in each snapshot. Moreover, the snapshot counter matrix 110 is configured to maintain the set of snapshot counters for each snapshot. Here, each of the previous snapshots includes snapshots created on or before the current snapshot based on one or more modified data blocks. For example, upon initial creation of the first snapshot 502, no snapshot counters are maintained. However, when the second snapshot 504 is created, a snapshot counter (C1-1) corresponding to the previous snapshot 502 is maintained and the value of the snapshot counter (C1-1) is set to 3 with one data block (data block 2) from the previous snapshot 502 being deleted and two data blocks (data block 3 and data block 6) from previous snapshot 502 being overwritten in the current snapshot 504.

Similarly, upon creation of the third snapshot 506, two snapshot counters (C2-1) and (C2-2) corresponding to the previous snapshots 502 and 504 are maintained respectively. The value of snapshot counter (C2-1) is set to 2 with one data block (data block 5) from previous snapshot 502 being deleted and one data block (data block 8) from previous snapshot 502 being overwritten in the current snapshot 506. Similarly, for snapshot counter (C2-2), the value is set to 2 with two data blocks (data block 12 and data block 13) from previous snapshot 504 being overwritten in the current snapshot 506.

Further, upon the creation of the fourth snapshot 508, three snapshot counters (C3-1), (C3-2) and (C3-3) corresponding to the previous snapshots 502, 5011 and 506 are maintained. The value of snapshot counter (C3-1) is set to 1 as one data block (data block 1) from previous snapshot 502 has been overwritten in current snapshot 508. Similarly, the value of (C3-2) is set to 1 as one data block (data block 11) from previous snapshot 504 has been overwritten in current snapshot 508 and the value of (C3-3) is set to 1 as one data block (data block 16) from previous snapshot 506 has been overwritten in current snapshot 508. Thus, a set of snapshot counters corresponding to each of the previous snapshots created on or before the current snapshot is maintained by the snapshot counter matrix based upon one or more data blocks.

As described previously, when a snapshot is deleted and if a version of the snapshot counter for the deleted snapshot, is lesser than or equal to a creation version of the previous snapshot, then the snapshot counter of the deleted snapshot is added to the corresponding entry in the previous snapshot. Alternatively, if a creation version of the snapshot counter for the deleted snapshot, is greater than the version of the previous snapshot, then the snapshot counter of the deleted snapshot is subtracted from overall usage.

Figure 6:
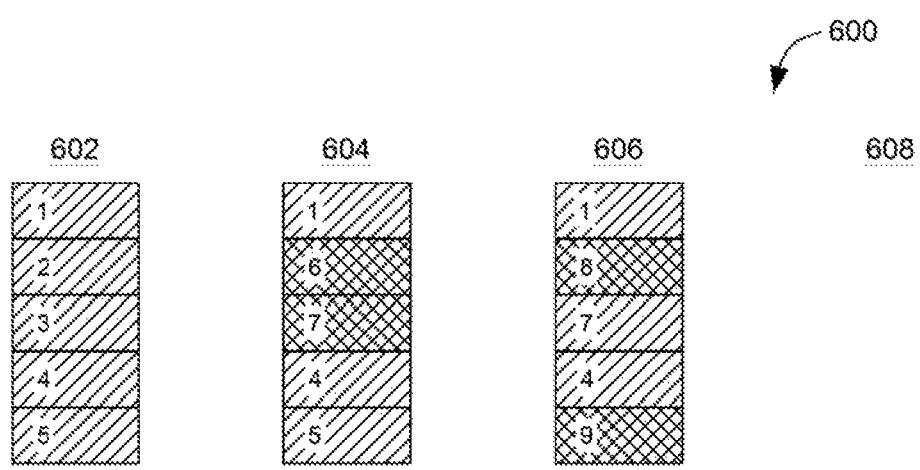
FIG. 6 illustrates example snapshots of a versioned storage having one or more files tracked using the snapshot usage tracking system of FIG. 1, implemented according to the present technique.

FIG. 6 illustrates example snapshots 600 of a versioned storage having one or more files tracked using the snapshot usage tracking system 100 of FIG. 1, implemented according to the present technique. In the illustrated example embodiment, a snapshot 602 of a file (e.g., F-1) with 5 data blocks (data blocks 1 to 5) is accessed. A file counter FC-1 is maintained for snapshot 602. In an embodiment, the value of the file counter is set to sum of the size of data blocks that were created in the snapshot. Therefore, the value of the file counter FC-1 is set to sum of size of 5 data blocks.

In a subsequent snapshot 604, two of the data blocks (data block 2 and data block 3) are over written by data block 6 and data block 7 respectively. Here, for snapshot 604, two file counters (e.g., FC-1 and FC-2) are maintained. The value of FC-1 is set to sum of size of 3 data blocks as data blocks 1, 4 and 5 are retained from the previous snapshot 602 and data block 2 and data block 3 are overwritten. The value of FC-2 is set to sum of size of 2 data blocks as data block 6 and data block 7 are created in snapshot 604.

Similarly, for another snapshot 606, three file counters (e.g., FC-1, FC-2 and FC-3) are maintained. The value of FC-1 is set to sum of size of 2 data blocks (1 and 4) that are retained from the previous snapshot 602. Similarly, the value of FC-2 is set to sum of size of 1 data block (data block 7) retained from the previous snapshot 604. Nothing will be retained in the snapshot 608, any file and data block being deleted therein. In addition, the file counter FC-3 is set to sum of size of 2 data blocks (8 and 9) that are deleted in the snapshot 608 but created in the snapshot 606.

Subsequently, the file is deleted in snapshot 608. In this embodiment, the snapshot counters (C3-1), (C3-2) and (C3-3) are updated. The value of the snapshot counter (C3-1) is set to sum of size of 2 data blocks, (C3-2) is set to sum of size of 1 data block and (C3-3) is set to sum of size of 2 data blocks. Thus, a set of snapshot counters and a set of file counters is maintained while tracking one or more deleted snapshots and estimating a size of freed versioned storage based upon the set of snapshot counters.

The present techniques provide an efficient way of snapshot usage tracking in storage systems such as versioned storage systems. The techniques described above disclose an efficient and cost effective method to calculate size of freed up storage without going through space reclaiming in storage systems.

Figure 7:
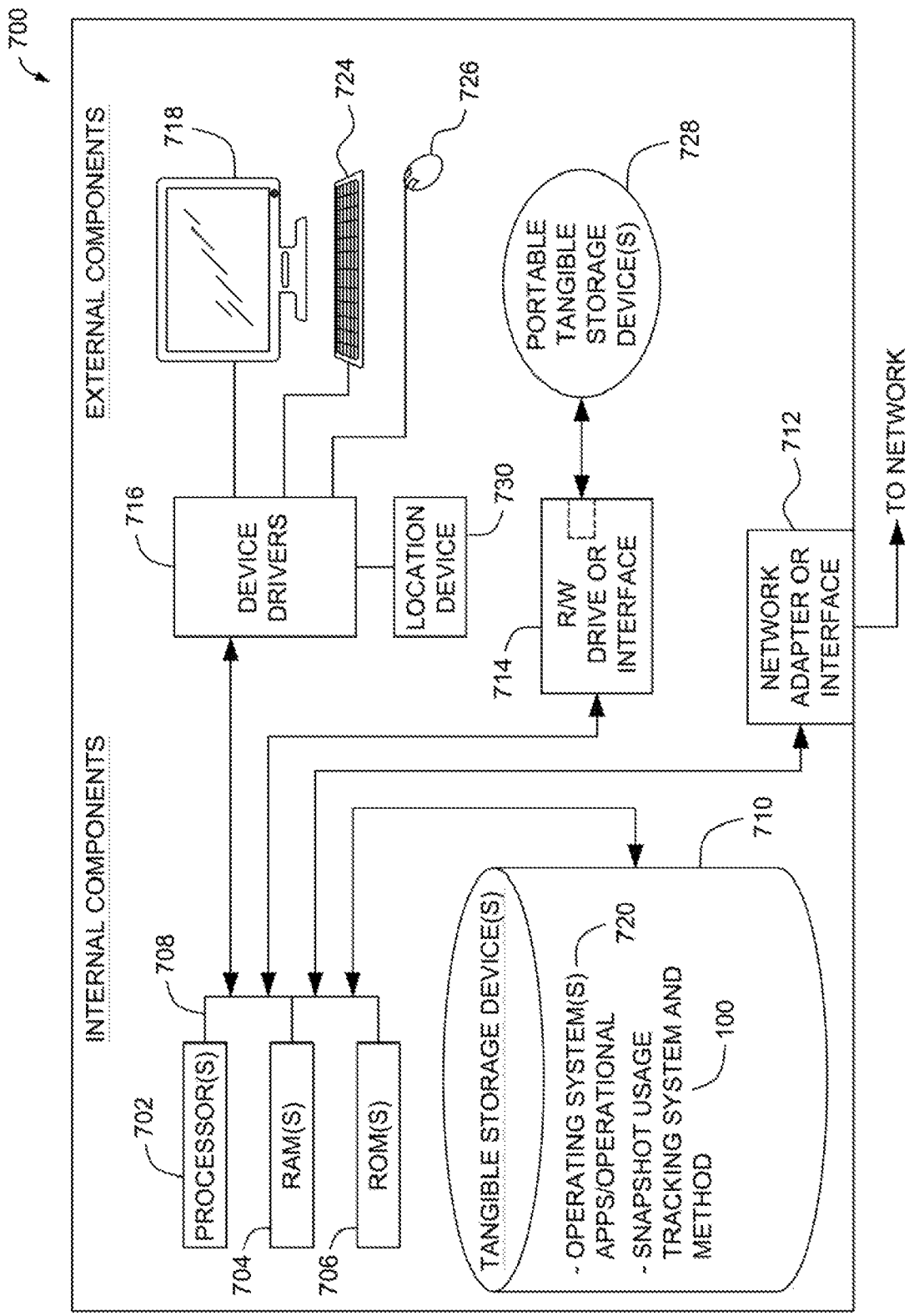
FIG. 7 is a block diagram of an embodiment of a computing device in which the modules of the snapshot usage tracking system, described herein, are implemented.

The modules of the snapshot usage tracking system 100 described herein are implemented in computing devices. One example of a computing device 700 is described below in FIG. 7. The computing device includes one or more processor 702, one or more computer-readable RAMs 704 and one or more computer-readable ROMs 706 on one or more buses 708. Further, computing device 700 includes a tangible storage device 710 that may be used to execute operating systems 720 and a snapshot usage tracking system 100. The various modules of the system 100 includes a snapshot repository 102, a processor 104 and a memory 106. The processor 104 further includes a snapshot comparison module 108 and a snapshot counter matrix 110.

The modules may be stored in tangible storage device 710. Both, the operating system 720 and the system 100 are executed by processor 702 via one or more respective RAMs 704 (which typically include cache memory). The execution of the operating system 720 and/or the system 100 by the processor 702, configures the processor 702 as a special purpose processor configured to carry out the functionalities of the operation system 720 and/or the snapshot usage tracking system 100, as described above.

Examples of storage devices 728 include semiconductor storage devices such as ROM 706, EPROM, flash memory or any other computer-readable tangible storage device that may store a computer program and digital information.

Computing device also includes a R/W drive or interface 714 to read from and write to one or more portable computer-readable tangible storage devices 728 such as a CD-ROM, DVD, memory stick or semiconductor storage device. Further, network adapters or interfaces 712 such as a TCP/IP adapter cards, wireless Wi-Fi interface cards, or 3G or 4G wireless interface cards or other wired or wireless communication links are also included in computing device.

In one example embodiment, the snapshot usage tracking system 100 includes a snapshot repository 102, a processor 104 and a memory 106. The processor 104 further includes a snapshot comparison module 108 and a snapshot counter matrix 110, may be stored in tangible storage device 728 and may be downloaded from an external computer via a network (for example, the Internet, a local area network or other, wide area network) and network adapter or interface 712.

Computing device further includes device drivers 716 to interface with input and output devices. The input and output devices may include a computer display monitor 718, a keyboard 724, a keypad, a touch screen, a computer mouse 726, and/or some other suitable input device.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The afore mentioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The invention claimed is:

1. A snapshot usage tracking system for a versioned storage, the system comprising:
   a memory having computer-readable instructions stored therein;
   a snapshot repository configured to store a plurality of snapshots of a versioned storage, wherein each of the plurality of snapshots comprises one or more data blocks;
   a processor communicatively coupled to the snapshot repository, wherein the processor is configured to maintain a set of snapshot counters corresponding to each of a plurality of previous snapshots, the each previous snapshot being created as or before a current snapshot,
   wherein each of the snapshot counters is indicative of a size of data blocks created in one of the previous snapshots and valid only until a more recent snapshot version,
   wherein the maintenance is based upon a size of data blocks modified or deleted in the current snapshot and created in the each previous snapshot that is created before the current snapshot, and
   wherein the maintenance comprises:
      determining overall usage;

identifying a deleted snapshot and another snapshot having a version that is immediately previous the deleted snapshot;

adding each snapshot counter, which corresponds to the deleted snapshot and which has a creation version that is less than or equal to the version of the another snapshot, to a snapshot counter, which has the same creation version, of the another snapshot; and updating the overall usage by subtracting each snapshot counter, which corresponds to the deleted snapshot and which has a creation version that is greater than the version of the another snapshot, from the overall usage.

2. The snapshot usage tracking system of claim 1, wherein the processor is further configured to execute the computer-readable instructions to:

access contents of each of the plurality of snapshots, wherein each of the plurality of snapshots comprises a point-in-time capture of the versioned storage; and compare the current snapshot with previous snapshots to identify the size of data blocks that are modified or deleted in the current snapshot.

3. The snapshot usage tracking system of claim 1, wherein the processor is further configured to execute the computer-readable instructions to set the set of snapshot counters corresponding to the each previous snapshot to a size of data blocks that were deleted or overwritten in the current snapshot and added in the each previous snapshot.

4. The snapshot usage tracking system of claim 1, wherein the processor is further configured to execute the computer-readable instructions to set a first snapshot counter (CY-X) for a snapshot version (Y) based on a more recent snapshot version (Y+1); and wherein the first snapshot counter (CY-X) is indicative of a size of data blocks created in a previous snapshot version (X) and valid only until the more recent snapshot version (Y+1).

5. The snapshot usage tracking system of claim 1, wherein the processor is further configured to execute the computer-readable instructions to track one or more deleted snapshots and to estimate a size of freed versioned storage based upon the sets of snapshot counters.

6. The snapshot usage tracking system of claim 1, wherein the processor is further configured to execute the computer-readable instructions to:

maintain a plurality of snapshot counters for each of the plurality of snapshots, wherein a size of the snapshot counters is based upon a version of the current snapshot, and store entries of the plurality of snapshot counters.

7. The snapshot usage tracking system of claim 1, further comprising an output to display the snapshot counters and the overall usage for the versioned storage to a user of the system.

8. A snapshot usage tracking system for a versioned storage, the system comprising:

a memory having computer-readable instructions stored therein;

a snapshot repository configured to store a plurality of snapshots of a versioned storage, wherein each of the plurality of snapshots comprises a plurality of files, each of the plurality of files having one or more data blocks;

a processor communicatively coupled to the snapshot repository, wherein the processor is configured to:

first maintain a set of file counters for each file based on a size of added or modified data blocks of the respective file; and second maintain a set of snapshot counters corresponding to each of the previous snapshots created on or before a current snapshot based upon the size of data blocks modified or deleted in the current snapshot, wherein each of the snapshot counters is indicative of a size of data blocks created in one of the previous snapshots and valid only until a more recent snapshot version, wherein the second maintenance comprises:

determining overall usage;

identifying a deleted snapshot and another snapshot having a version that is immediately previous the deleted snapshot;

adding each snapshot counter, which corresponds to the deleted snapshot and which has a creation version that is less than or equal to the version of the another snapshot, to a snapshot counter, which has the same creation version, of the another snapshot; and updating the overall usage by subtracting each snapshot counter, which corresponds to the deleted snapshot and which has a creation version that is greater than the version of the another snapshot, from the overall usage.

9. The snapshot usage tracking system of claim 8, wherein the processor is further configured to execute the computer-readable instructions to:

identify one or more deleted files;

update the snapshot counter corresponding to the snapshot of which the one or more files are deleted using the set of file counters for the one or more deleted files.

10. The snapshot usage tracking system of claim 8, wherein a file counter (F-X) for the each file represents a sum of a size of data blocks of the file created in a version (X).

11. The snapshot usage tracking system of claim 8, wherein the set of file counters are stored as metadata for each of the files.

12. The snapshot usage tracking system of claim 8, wherein the processor is further configured to execute the computer-readable instructions to:

identify one or more deleted files; and add the set of file counters maintained for each of the one or more deleted files to corresponding snapshot counters.

13. The snapshot usage tracking system of claim 8, wherein the processor is further configured to execute the computer-readable instructions to estimate the size of freed versioned storage based upon the set of file counters and the set of snapshot counters.

14. A method for tracking snapshot usage for a versioned storage, the method comprising:

accessing contents of a plurality of snapshots, wherein each of the plurality of snapshots comprises one or more data blocks;

comparing each current snapshot with previous snapshots to identify one or more modified data blocks in the current snapshot, and maintaining a set of snapshot counters for each of the previous snapshots created on or before the current snapshot based upon the one or more modified data blocks, wherein each of the snapshot counters is indicative of a size of data blocks created in one of the previous snapshots and valid only until a more recent snapshot version, wherein the maintenance comprises:
- determining overall usage;
- identifying a deleted snapshot and another snapshot having a version that is immediately previous the deleted snapshot;
- adding each snapshot counter, which corresponds to the deleted snapshot and which has a creation version that is less than or equal to the version of the another snapshot, to a snapshot counter, which has the same creation version, of the another snapshot; and
- updating the overall usage by subtracting each snapshot counter, which corresponds to the deleted snapshot and which has a creation version that is greater than the version of the another snapshot, from the overall usage.

15. The method of claim 14, wherein comparing the current snapshot with the previous snapshots comprises identifying one or more of new, deleted or overwritten data blocks.

* * * * *